US005088961A

United States Patent [19]

Sprain

[11] Patent Number: 5,088,961

[45] Date of Patent: Feb. 18, 1992

[54] PATTERN PRESSURE-SENSITIVE BUSINESS FORM CONSTRUCTION

[75] Inventor: Kenneth S. Sprain, Sun Prairie, Wis.

[73] Assignee: Uarco Incorporated, Barrington, Ill.

[21] Appl. No.: 607,247

[22] Filed: Oct. 31, 1990

[51] Int. Cl.[5] .......... B32B 7/10; B42D 15/00

[52] U.S. Cl. .......... 462/2; 462/54; 462/901; 283/66.1; 283/901

[58] Field of Search .......... 282/11.5 A, 11.5 R, 282/12 R, 25; 283/101, 901, 66.1; 462/2, 3, 5, 53, 54, 901; 156/234, 277, 289, 519

[56] References Cited

U.S. PATENT DOCUMENTS

| | | | |
|---|---|---|---|
| Re. 31,752 | 12/1984 | Halse . | |
| 3,383,121 | 5/1968 | Singer . | |
| 3,837,565 | 9/1974 | Johnsen | 282/11.5 A X |
| 4,051,995 | 10/1977 | Wieman | 282/11.5 A X |
| 4,103,053 | 7/1978 | Barehas . | |
| 4,627,994 | 12/1986 | Welsch . | |
| 4,654,251 | 3/1987 | Okada et al. . | |
| 4,664,416 | 5/1987 | Steidinger | 282/11.5 A |
| 4,705,298 | 11/1987 | Van Malderghem et al. . | |
| 4,854,610 | 8/1989 | Kwiatek | 282/11.5 A |
| 4,861,636 | 8/1989 | Barnette . | |
| 4,910,058 | 3/1990 | Jameson | 283/101 X |

*Primary Examiner*—Joseph M. Gorski

*Assistant Examiner*—Peter Dungba Vo

*Attorney, Agent, or Firm*—Wood, Phillips, Mason, Recktenwald & VanSanten

[57] ABSTRACT

A business form construction including a first sheet or ply (12) of face stock having a first surface (10) with an image-receiving portion (14) thereof adapted to receive printed variable information and an opposed second surface (44) having a pressure-sensitive adhesive (48) applied to a portion (46) thereof. A sheet of release liner (50) includes a third surface (54) and an opposed fourth surface (62). The third surface (54) is removably adhered to the pressure-sensitive adhesive (48). A second sheet or ply (30) of face stock includes a fifth (28) and an opposed sixth surface. A marking system (64) is located between the fourth and fifth surfaces, (62) and (28) respectively, and creates a visible image on the fifth surface (28) when printed information is inscribed on the image-receiving portion (14) of the first surface (10).

10 Claims, 2 Drawing Sheets

PATTERN PRESSURE-SENSITIVE BUSINESS FORM CONSTRUCTION

FIELD OF THE INVENTION

This invention relates to business forms of the type including components provided with pressure-sensitive adhesive and chemical coatings which, under pressure, create images on aligned surfaces.

BACKGROUND OF THE INVENTION

A large variety of business form products utilize components provided with pressure-sensitive adhesive. In the usual case, variable information is inscribed on the form and then the pressure-sensitive adhesive-bearing component is removed and applied to some other substrate. For example, many business forms used as packing slips or the like are printed upon by being passed through a computer printer. Heretofore, part of the form may have included a component with a pressure-sensitive adhesive backing on a release liner. This component receives, in the usual case, addressee information as the variable information.

After the printing operation is completed, the component having a pressure-sensitive adhesive backing may be stripped from the remainder of the form and placed on a shipping container or the like as a means of directing the container to the proper recipient. The packing slip, itself, may be disposed within the container or the like.

Often, several copies of the information printed on a business form are required. To save printing costs and time, printing is performed on the uppermost ply of business form while the intended copies are subjacent plies. A chemical coating is applied or other image transfer material located between the plies. When pressure is applied to the top ply, the coating creates images on the lower plies to make copies.

Problems arise when the lower plies do not require all the information printed on the upper plies. Furthermore, it is often desired that the lower plies be stripped from the corresponding top ply or plies so that, later, they can be placed on a shipping container, serve as an accounting report, or an inventory record, or the like. The present invention is directed to overcoming one or more of the above problems.

SUMMARY OF THE INVENTION

It is a principal object of the invention to provide a new and improved business form of the type including a removable component having pressure-sensitive adhesive. More specifically, it is an object of the invention to provide a multiple-ply business form having a chemical coating located between plies such that when pressure is applied, as by printing on the top ply, the image is transferred to subsequent plies. Furthermore, the coating is applied such that only selected portions of the information printed on the top ply is transferred to the lower plies.

An exemplary embodiment of the invention achieves the foregoing object in a business form construction including a first sheet or ply of face stock having a first surface with a portion thereof adapted to receive printed information and an opposed second surface having a pressure-sensitive adhesive applied to a section thereof. The portion has a first shape. A sheet or ply of release liner has a third and an opposed fourth surface. The third surface is removably adhered to the pressure-sensitive adhesive. A second sheet or ply of face stock has a fifth and sixth surface. An image transfer means is located between the opposed fourth and the fifth surfaces for creating a visible image on the fifth surface when the printed information is inscribed on the previously-mentioned portion of the first ply. The marking means has a second shape.

In a preferred embodiment, the first shape is substantially similar to the second shape such that all of the printed information on the portion is transferred via the image transfer means to the second sheet.

In an alternate embodiment, the second shape is smaller than the first shape such that only selected areas of the printed information on the first ply is imaged on the second ply.

In a highly preferred embodiment, a closed die cut in the first ply circumscribes the portion to allow the portion to be removed from the remainder of the first ply.

In another preferred embodiment, the marking means includes a first coating applied to the fourth surface of the release liner and a second coating applied to the fifth surface of the second ply.

The invention further contemplates that the business form be a continuous business form.

Other objects and advantages will become apparent from the following specification taken in connection with the accompanying drawings.

DESCRIPTION OF THE PREFERRED EMBODIMENT

Figure 1:
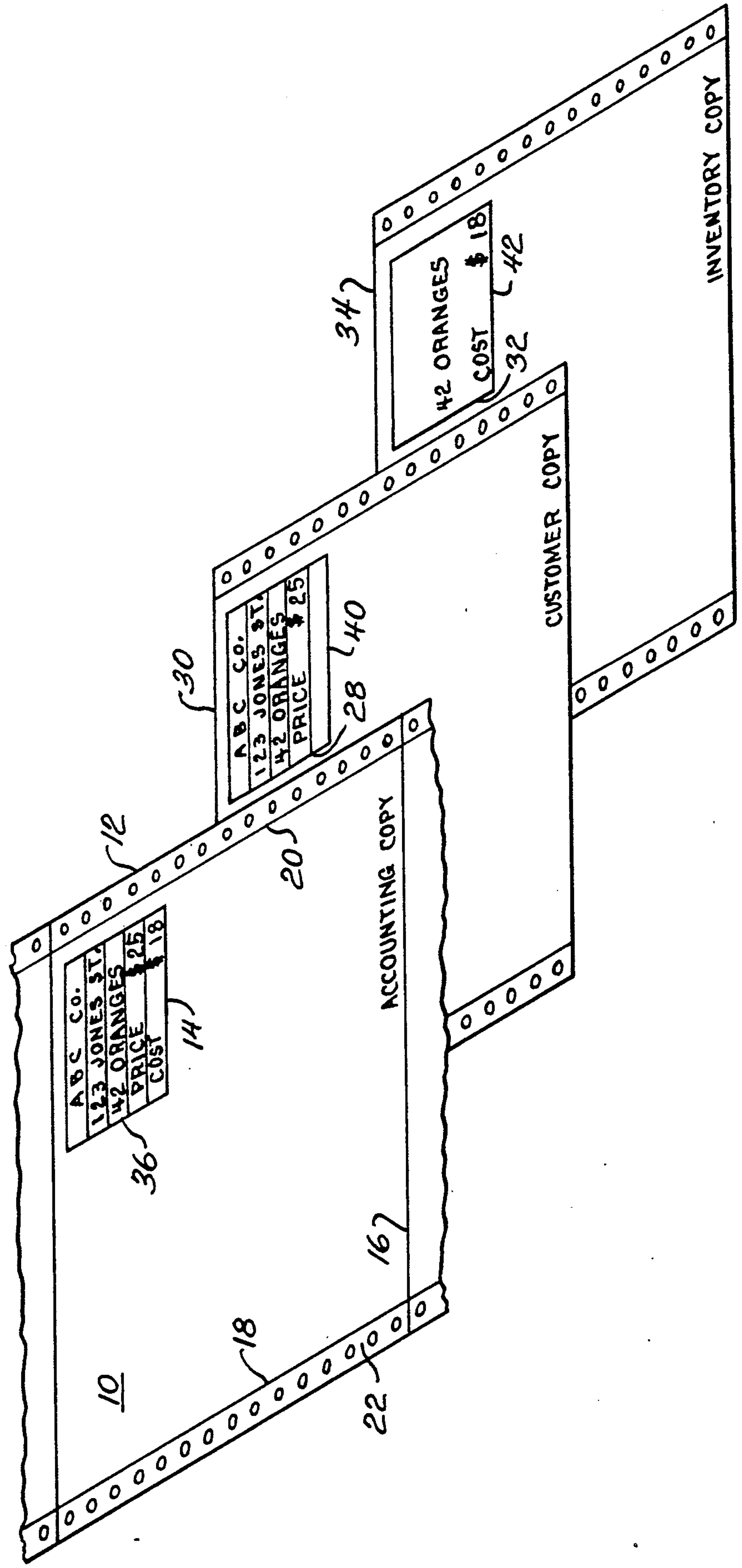
FIG. 1 is an exploded, perspective view of a continuous business form including multiple plies and made according to the invention.

An exemplary embodiment of the invention is illustrated in the drawings and with reference to FIG. 1 is seen to be in the form of a multiple-ply business form made up of a plurality of superimposed plies. A side 10 of a first or top ply 12 includes a printing or image-receiving surface 14 adapted to receive printed information. Transverse lines of weakening 16, such as perforations, divide the first ply 12 into individual form lengths as is well known and in the usual case, one or both margins 18 or 20 are provided with pin feed holes 22 to define a so-called control punch margin.

In the embodiment illustrated, which is merely representative, the surface 14 is adapted to receive printed variable information and may be preprinted with fixed information as well. As is well known "fixed" information is that which is common to all form lengths. An example would be letterhead information on an invoice. "Variable" information is that which changes from one form length to the next as, for example, addressee information or bill of materials information. According to the invention, the variable information printed on the surface 14 of the first ply 12 is selectively transferred to an image-receiving surface 28 of a second ply 30 and an image-receiving surface 32 of a third ply 34. A die cut 36 is provided on the first ply 12 so that the surface 14 may be removed from the first ply 12 for later application to another substrate. The die cut 36 is preferably, but not necessarily, the same size as the printing surface 14. The second and third plies, 30 and 34, respectively, preferably, but not necessarily, include similar die cuts, 40 and 42.

Figure 2:
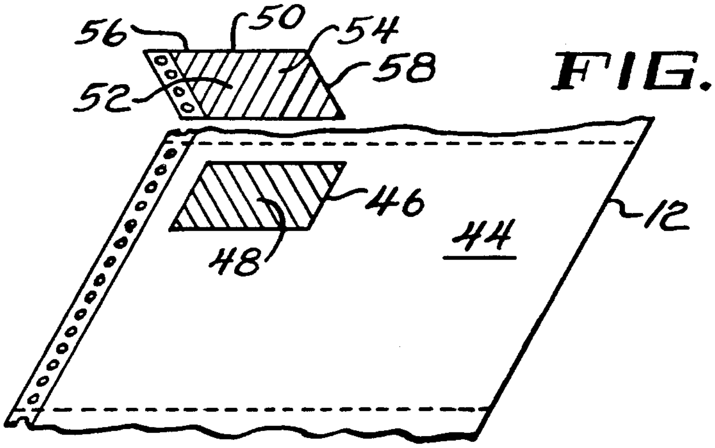
FIG. 2 is a perspective view of the top ply and the back side thereof showing the pressure-sensitive liner unattached thereto.

FIG. 2 shows the back side 44 of the first ply 12. The back side 44 has a portion 46 thereof preferably corresponding to the shape of the surface 14 circumscribed by the die cut 36. A pressure-sensitive adhesive 48 is applied to the portion 46. A release liner 50 is adhered to the pressure-sensitive adhesive 48 located on the first ply 12. The release liner 50 includes a release coating 52 applied to a side 54 thereof. Typically, the release liner 50 would have dimensions equal to or slightly larger than the area of pressure-sensitive adhesive 48 applied to the portion 46.

Figure 3:
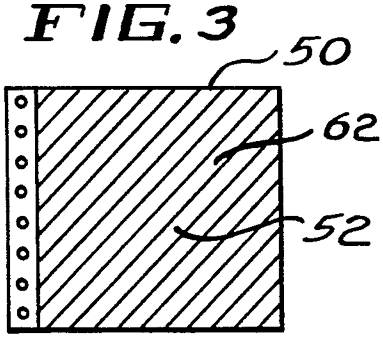
FIG. 3 is a plan view of one side of the release liner.

The release liner 50 has margins 56 and 58 which may be provided with pin feed holes 60 on one or both margins to define a control punch margin. This allows the release liner to be "tipped" on to the ply 12 in a conventional fashion. The release liner 50 of FIG. 2 can best be seen in the plan view of FIG. 3.

Figure 4:
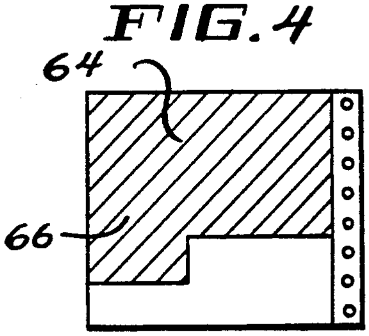
FIG. 4 is a plan view of the opposed side of the release liner.

FIG. 4 shows the opposite side 62 of the release liner 50 to include a conventional "CB" imaging coating 64 applied to select portions of the opposed side 62 of the release liner 50 to form a transfer pattern 66. The transfer pattern 66, portions of the opposed side 62 of the release liner 50 which have the "CB" coating applied thereto, when overlying a lower ply having conventional "CF" imaging coating will transfer information printed on the surface 14 to the lower ply. Alternatively, "CFB" or hot spot carbon system may be used as image-transfer means.

Figure 5:
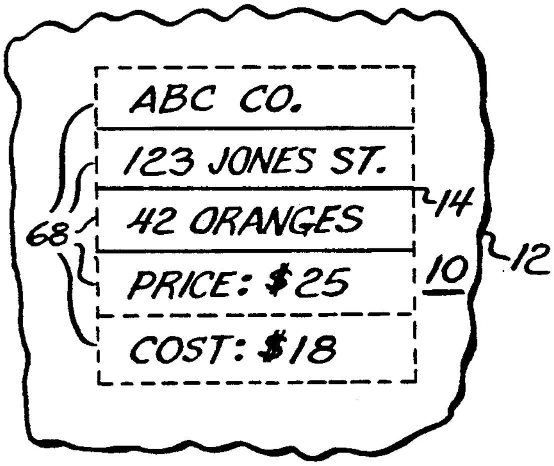
FIG. 5 is a fragmentary plan view of the printing surface located on the opposed side of the business form shown in FIG. 2.

The surface 14 of FIG. 1 is divided into multiple variable information receiving fields 68, as best seen in FIG. 5. The information receiving fields 68 can include a customer name field 70, an address field 72, a quantity field 74, a price field 76, a cost field 78, etc., and certain designation in each, i.e., "price" or "cost" may be fixed information.

Figure 6:
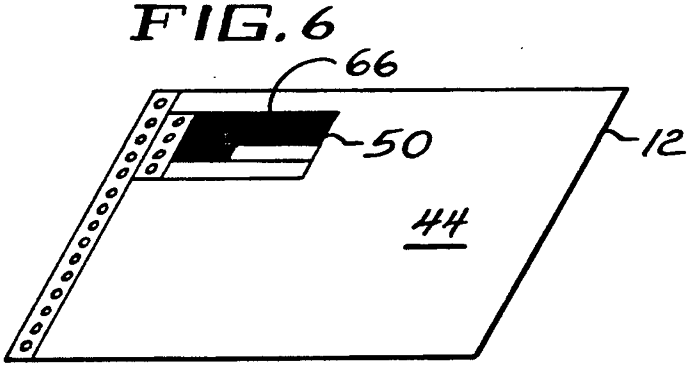
FIG. 6 is a perspective view similar to FIG. 2 but showing the release liner attached to the top ply.

The release liner 50 is tipped onto the first ply 12 with its release coating 52 in contact with the pressure-sensitive adhesive 48, as best seen in FIG. 6. Adhesive coatings and release liners for the second and third plies, 30 and 34 respectively, may be employed and preferably are constructed similarly to the adhesive-release liner system described in reference to the first ply 12. In the interest of brevity, that description will not be repeated. These systems and the die cut may be omitted on one or more intermediate plies or the lowermost ply, if desired.

It can be appreciated from the foregoing that select portions of the information printed on the first ply 12 can be transferred to the second and third plies, 30 and 34, respectively. For example, in FIG. 1, the cost field 78 is omitted from the second ply 30. In addition, select portions of each field can be omitted. In the second ply, half of the price field 76 has been omitted. To avoid printing in the area of the omitted field 76 on the second ply 30, it is only necessary to omit the image transfer system between the first and second plies in this area. Printing in the price field 76 on the third or subsequent plies may still be had if image transfer material is appropriately located between the ply of concern and that immediately above it. The ability to vary the information on subsequent plies is especially useful, for example, in the case where the plies will be sent to different destinations. In this case, the cost field and its associated dollar amount would be undesirable on the printing surface that would be sent to a customer, while it would be desirable on the accounting copy.

The third ply 34 may have a unique transfer pattern 66 such that a different combination of the information fields 68 is transferred to the printing surface 32 of the third ply 34 compared to the second ply 30. For example, the third ply 34 includes the quantity and cost fields 74 and 78, respectively, while the customer name, address and price fields, 70, 72 and 76, respectively, are omitted. The ability to selectively print at selected locations that vary from one ply to the next increases the flexibility in the design of a business form. Other business form designs may have the disadvantage of enabling a subsequent ply to have information that was printed on a preceding ply only. For example, a field omitted on the second ply must be omitted on the third ply. This problem is overcome by the present invention.

After printing is complete, the die cuts on the respective plies allow the image-receiving surface to be removed from the rest of the ply for later application to another surface. For example, the die cut 36 on the first ply 12 enables the part of the first ply having the surface 14 to be removed with the release liner 50 attached. At a later time, the liner 50 can be removed so that the part of the first ply having the surface 14 can be applied to a shipping container or the like via the pressure-sensitive adhesive 48 to serve as a shipping label.

As can be appreciated from the drawings and description provided herein, when printing is performed on the image-receiving surface of the first ply, a visual image is created on a subsequent ply according to the transfer pattern located on the opposed surface of the release liner located on the preceding ply. It can be appreciated that additional plies may be provided with additional transfer patterns such that other combinations of the information printed on the printing surface of the first ply may be transferred to the subsequent plies. All of the plies are preferably, but not necessarily, provided with a die cut such that the printing surface may be removed from the rest of the business form and later attached to the final surface.

Moreover, the image-receiving surface 14 of the first ply 12 or any lower ply may be die cut into several distinct and independently removable segments. In this way, one might use one image-receiving surface as a means to provide a plurality of adhesive price tags matched to merchandise in a shipping container which in turn is addressed by an adhesive label formed by the image-receiving surface of another ply.

From the foregoing, it will be appreciated that a business form made according to the invention can be made inexpensively.

While the invention has been described in connection with one embodiment thereof, one should readily appreciate that a variety of other uses may be made of the invention. That is to say, the invention can be used with efficacy in virtually any instance where it is desirable to print multiple variable information fields on multiple plies using only portions of the information fields for each ply. The printed portions of the multiple plies can preferably be removed via die cuts from the remaining plies.

What is claimed is:

1. A business form construction comprising:

a top sheet of face stock having a top surface with a portion thereof adapted to receive printed information and an opposed bottom surface having a pressure-sensitive adhesive applied to a section thereof, the portion of the top surface of the sheet having a first shape;

a sheet of release liner having a first surface and an opposed second surface, the first surface being removably adhered to the pressure-sensitive adhesive on the bottom surface of the top sheet;

a bottom sheet of face stock having a top surface and an opposed bottom surface;

a marking means located between the second surface of the sheet of release liner and the top surface of the bottom sheet for creating a visible image on the top surface of the bottom sheet when the printed information is inscribed on the portion of the top surface of the top sheet, the marking means having a second shape.

2. The business form construction of claim 1 wherein the first shape is substantially similar to the second shape such that all of the printed information on the portion is transferred to the bottom sheet.

3. The business form construction of claim 1 wherein the second shape is smaller than the first shape such that selected areas of the printed information on the portion is transmitted to the bottom sheet.

4. The business form construction of claim 1 wherein a die cut in the top sheet circumscribes the portion to allow the portion to be removed from the top sheet.

5. The business form construction of claim 1 wherein the marking means includes a first coating applied to the second surface of the release liner.

6. The business form construction of claim 1 wherein the marking means includes a second coating applied to the top surface of the bottom sheet.

7. A business form comprising:

a top sheet of face stock having a top surface with a portion thereof adapted to receive printed variable information and an opposed bottom surface having a pressure-sensitive adhesive applied to a section thereof, the portion of the top surface of the top sheet having a first shape;

a sheet of release liner having a first surface and an opposed second surface with a first imaging coating applied thereon in a second shape, the first surface being removably adhered to the pressure-sensitive adhesive on the bottom surface of the top sheet;

a bottom sheet of face stock having a top surface and an opposed bottom surface, the top surface having a second imaging coating applied thereon in the second shape; and a die cut in the top sheet of face stock circumscribing the portion and the section of the top sheet;

whereby when the opposed bottom surface of the top sheet and the top surface of the bottom sheet are aligned, printing on the portion of the top sheet causes the first and second coatings to create a visible image on the bottom sheet.

8. A business form construction comprising:

a top sheet of face stock having a first surface with a portion thereof adapted to receive printed information comprising a plurality of information fields and an opposed second surface having a pressure-sensitive adhesive applied to a section therof:

a bottom and at least one intermediate sheet of face stock each having a third and an opposed fourth surface, the opposed fourth surface having a pressure-sensitive adhesive applied to a section thereof;

a top, bottom and at least one intermediate release liner each having a fifth surface and an opposed sixth surface, the fifth surface being removably adhered to the pressure-sensitive adhesive of the top, bottom and intermediate sheets;

a first marking means located between the opposed sixth surface of the top release liner and the third surface of the intermediate sheet for creating a first visible image on the third surface of the intermediate sheet when printed information is inscribed on the portion, the first marking means having a first shape; and a second marking means located between the opposed sixth surface of the intermediate liner and the third surface of the bottom sheet for creating a second visible image on the third surface of the bottom sheet when printed information is inscribed on the portion, the second marking means having a second shape.

9. The business form construction of claim 8 wherein the first shape is smaller than the second shape so that the first image created contains fewer information fields than that printed on the portion while the second image created contains more information fields than the first image.

10. The business form construction of claim 8 wherein the second shape is smaller than the first shape so that the second image created contains fewer information fields than that printed on the portion while the first image created contains more information fields than the second image.

* * * * *